Jan. 23, 1962  R. G. NICHOLSON  3,018,151
HOUSING STRUCTURE FOR INSTRUMENT MECHANISMS OR THE LIKE
Filed March 24, 1958

*INVENTOR.*
RONALD G. NICHOLSON

BY Bonner, Edmonds, Morton,
Barrows & Taylor
ATTORNEYS

3,018,151
HOUSING STRUCTURE FOR INSTRUMENT MECHANISMS OR THE LIKE

Ronald G. Nicholson, Tomaston, Conn., assignor to Consolidated Electronics Industries Corp., Waterbury, Conn., a corporation of Delaware
Filed Mar. 24, 1958, Ser. No. 723,349
5 Claims. (Cl. 312—352)

The present invention relates to housing or casing structures, and more particularly to a novel and improved structure suitable for housing delicate instrument mechanisms, or the like.

Various mechanisms, such as those frequently used in aircraft, for example, are conventionally constructed within a suitable frame structure, which supports parts of the mechanism in operative relation. It is also conventional to provide suitable housings or enclosures, into which the assembled frame and mechanism may be inserted. The housing serves to protect the mechanism from dirt and foreign objects, and, in some cases, the housing may be sealed to keep out moisture, etc.

In many cases, a housing structure, which, for the purpose of this application, may be considered as comprising the frame and housing, is so shaped and dimensioned that the frame fits tightly within the housing to prevent any vibration. Heretofore, this has been accomplished by providing a housing including a tube-like body portion and so dimensioning the body portion and the frame, one with respect to the other, that, when the frame is telescopically inserted into the tube-like body portion, parts of the frame interfere with parts of the body portion. The interference is slight, so that the frame and housing may be telescopically assembled by the application of force, but is sufficiently large to assure that the assembled parts are engaged tightly.

Because of strength and rigidity requirements, the frame part of the housing structure is generally formed of metal, and the housing part is frequently formed of metal, although, in appropriate cases, it may be formed of a suitable plastic material. Accordingly, in housing structures of known design, when the frame and housing parts are telescopically assembled, the interfering frame parts scrape along walls of the housing and tend to remove chips or particles of material therefrom. Particles of material thus scraped and removed may fall into parts of a delicate mechanism and cause the mechanism to jam or otherwise fail to function properly. For this reason, it has been necessary, heretofore, to dimension carefully parts of the frame and housing, so that sufficient interference was provided to assure the proper tight fit, while minimizing excessive scraping between parts during assembly. Notwithstanding precautions, the scraping off of some material was virtually inevitable, as long as there was any interference during assembly.

In accordance with the present invention, a novel and improved housing structure is provided in which one of the housing or frame parts, usually the frame, includes a plurality of spacer elements formed of a semi-resilient material, such as nylon or Teflon. The frame and housing parts are so shaped and dimensioned as to be capable of interference-free telescopic assembly, while the semi-resilient spacer elements carried by one of the members are arranged in interfering relation with the other member, so that the desired tight, vibration-free fit is obtained upon telescopic assembly. The nature of the semi-resilient material, which forms the spacers, and the arrangement of the spacers, is such as to eliminate completely the scraping of particles from one of the parts during assembly.

One of the collateral advantages of the new housing structure is that certain of the manufacturing tolerances may be relaxed without potential sacrifice of the desired tightness of fit, since substantially a greater interference may be tolerated in the new design. Another collateral and important advantage of the new structure is that the semi-resilient spacer elements form acoustic isolation between the internal structure or mechanism and the outer housing.

For a better understanding of the invention, reference should be made to the following detailed description, and to the accompanying drawing, in which.

Figure 1:
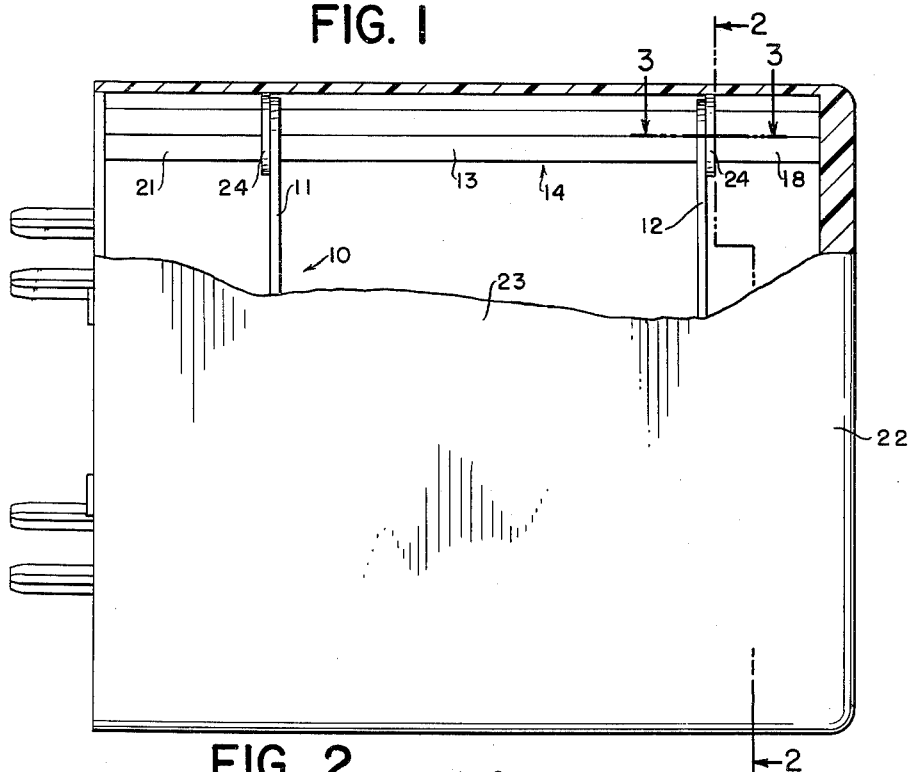
FIG. 1 is an elevational view of an assembled housing structure incorporating the invention, with parts broken away to illustrate certain details.

Referring now to the drawing, the reference numeral 10 designates generally a frame of the type commonly used in the manufacture of various instrument mechanisms and the like. The illustrated frame comprises a pair of spaced plate-like elements 11, 12 forming decks upon which parts of a mechanism may be mounted. Extending between and projecting beyond the plate-like elements 11, 12 are posts 13, which are usually formed of hex. bar stock, and, in the illustrated form of the invention, the plates 11, 12 are of rectangular shape and posts 13 are arranged at the four corners thereof.

In accordance with conventional practice, the posts 13 are comprised of a plurality of sections. A central section 14 extends beween the plates and has recesses 15 at each end. Bosses 16 are also formed at each end of the central section, and these are adapted to be received in openings of similar size in the plates 11, 12. An end section 18 of the post is illustrated in detail in FIG. 3, and that section is provided at one end with a cylindrical boss 19 and a threaded projection 20 adapted to be received and engaged by suitable threads in the recess 15 of the central post section. The boss 19 is of larger diameter than the opening 17 in the plate 12, so that the post sections 14, 18 and the plate 12 may be secured as a rigid assembly by threadedly engaging the sections 14, 18 on opposite sides of the plate.

At the opposite end of the frame are post sections 21, which may be substantially identical to the post sections 18 and serve to secure the plate 11 in assembled relation with the posts.

Figure 2:
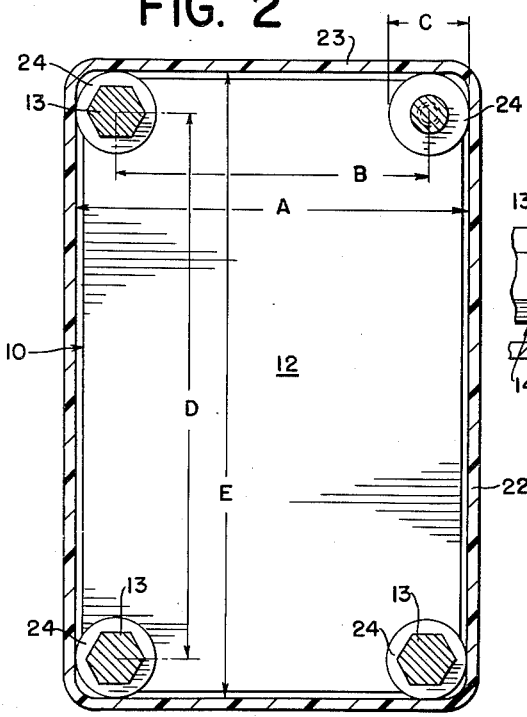
FIG. 2 is a cross-sectional view taken generally along line 2—2 of FIG. 1.

The apparatus also includes a housing 22 of suitable size and shape to receive the frame, and, in the illustrated apparatus, the housing, which may be formed of clear polystyrene, for example, is advantageously of rectangular shape and at least a portion of the housing comprises a tube-like body 23 having portions of uniform cross section. In accordance with the invention, the body portion 23 of the housing is so shaped and dimensioned as to permit the assembled posts and plates of the frame to be freely received telescopically in the housing. Thus, as will be observed in FIG. 2, the plates 11, 12 clear the body walls about their entire periphery and the posts 13 are located within the peripheral limits of the plates.

Figure 3:
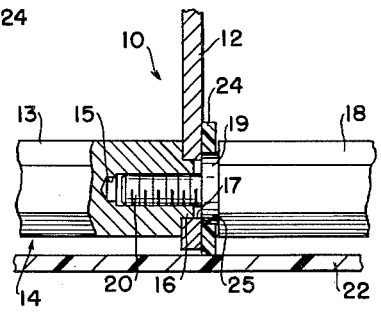
FIG. 3 is an enlarged, fragmentary cross-sectional view taken on line 3—3 of FIG. 1.

Also in accordance with the invention, a plurality of spacers, formed of semi-resilient material, are provided for holding the frame and housing tightly in assembled relation. Advantageously, the semi-resilient spacers take the form of washers 24, made out of nylon, Teflon or similar material, and, as shown in FIG. 3, the washers 24 are provided with central openings of a size appropriate to enable the washers to be received on the cylindrical bosses 19 of post sections 18, 21, the thickness of the washers being substantially equal to the axial length of the bosses.

The diameter of the washers 24 is such, in relation to the inside dimensions of the housing body 23 and the center-to-center distance between the posts 13, that the dimension between outer limits of a pair of washers is somewhat greater than the corresponding internal dimension of the housing body. Thus, the dimension A, between side walls of the body, exceeds the dimension B, between centers of a horizontal pair of posts, by an amount slightly less than the diameter of a washer, represented by the dimension C. Advantageously, in a housing body of approximately 2 inches in width, the sum of the dimensions B and C may exceed the dimension A by approximately 0.010 inch. Similar dimensional relationships will, of course, prevail with respect to vertical dimensions. That is, the dimension E, between top and bottom walls of the housing body, will exceed the dimension D, between centers of a vertical pair of posts, by an amount slightly less than the dimension C.

The new housing structure is assembled by first assembling the frame, together with its mechanism, etc., and then inserting the frame telescopically into the housing body 23. The metal parts of the frame and mechanism are freely received within the housing body, while the spacing washers interfere with the housing walls. Upon the application of sufficient force, the semi-resilient washers deform sufficiently to enable the housing and frame to be assembled, and the washers, although pressed tightly against the housing walls, will not scrape material from the walls during telescopic assembly.

In a housing structure of normal dimensions, the spacing washers are arranged in longitudinally spaced sets, so that the frame is supported in the housing at longitudinally spaced areas. Two sets are usually sufficient, although more may be provided where the structure is of substantial length.

Advantageously, the sets of spacing washers are mounted immediately adjacent the transverse plates 11, 12, which provide substantial transverse support to maintain the desired dimensional relationships, but the number and location of the spacing washers of a set may vary, depending upon the size and shape of the structure. Thus, where the housing body is of circular cross section, each set of spacing washers may consist of three washers, spaced equally with respect to the circumscribing circular cross section. Other structural configurations are equally adaptable to the incorporation of the improved features of the invention as will be readily understood.

The new housing structure is a substantial improvement over known arrangements, in that tight, vibration-free assemblies may be consistently provided while, at the same time, the possibility of damaging a delicate instrument or mechanism by chips or shavings removed from the housing wall is effectively obviated. To this end, of each pair of surfaces which is in contact during telescopic assembly of the structure, one of the surfaces is formed of a semi-resilient material, such as nylon or Teflon. And the arrangement is such that substantial interference between the surfaces may be accommodated by the resilient nature of one of the surfaces, and shaving or chipping of the housing walls is effectively avoided, notwithstanding that a very tight fit is achieved. The semi-resilient spacers also absorb vibrations between the outer housing and the internal frame to reduce noises, for example, generated by the operation of a mechanism supported in the frame.

The new housing structure is of simple and inexpensive construction, and requires minimum departure from present manufacturing procedures. Thus, in the most advantageous form of the invention, the semi-resilient spacing elements may take the form of washers, cut from tubular stock and assembled on posts of the frame assembly.

It should be understood that the form of the invention herein illustrated and described is intended to be representative only, as certain changes may be made therein without departing from the clear teachings of the disclosure. Accordingly, reference should be made to the following appended claims in determining the full scope of the invention.

I claim:
1. A housing structure for instruments and the like comprising a housing member having a tubular body of uniform cross section over a predetermined length, a frame member telescopically received in said housing member, said frame member comprising a plurality of longitudinally disposed posts disposed adjacent sidewalls of said tubular body and transversely projecting spaced sets of semi-resilient washers carried on said posts engaging said tubular body at longitudinally spaced points to support said frame within said housing member, said washers being so arranged with respect to said tubular body as to be compressed thereby when said housing and frame members are telescopically assembled.

2. The housing structure of claim 1 in which said frame includes a plurality of transversely disposed plates engaging said posts, and said washers are carried on said posts immediately adjacent said plates.

3. The housing structure of claim 2 in which said housing body is of rectangular cross section, said frame includes four posts extending longitudinally adjacent the corners of said housing body, and the spacing washers are provided in sets of four, each washer of a set engaging two walls of said body on opposite sides of a corner thereof.

4. The housing structure of claim 2, in which each of said posts is formed of a plurality of interengaging parts, one part of each post has a cylindrical boss thereon, and a washer is received on the cylindrical boss.

5. A housing structure for instruments or the like comprising a housing member having a tubular body of uniform cross-section over a predetermined length, a rigid frame member telescopically received in said housing member, said frame member comprising at least two transverse plates adapted to mount a delicate instrument, means mounting said plates in longitudinally spaced relation within said housing member, a plurality of transversely projecting individual semi-resilient spacing washers, means engaging said spacing washers through the center openings thereof and securing said space washers to said plates said spacing washers being positioned to engage said tubular body at longitudinally and transversely spaced points to support said frame within said housing member, said spacing washers being so positioned with respect to said tubular body as to be compressed thereby when said housing and frame members are telescopically assembled.

References Cited in the file of this patent
UNITED STATES PATENTS

| | | |
|---|---|---|
| 2,019,778 | Enholm | Nov. 5, 1935 |
| 2,301,730 | Mann | Nov. 10, 1942 |
| 2,481,505 | Frazier | Sept. 13, 1949 |
| 2,488,368 | Bickham | Nov. 15, 1949 |
| 2,688,479 | Barbera | Sept. 7, 1954 |
| 2,717,818 | Bond | Sept. 13, 1955 |
| 2,762,678 | Moore | Sept. 11, 1956 |

FOREIGN PATENTS

| | | |
|---|---|---|
| 84,326 | Sweden | Sept. 11, 1935 |